(12) United States Patent
Eglin

(10) Patent No.: US 12,116,117 B2
(45) Date of Patent: Oct. 15, 2024

(54) AIRCRAFT HAVING AT LEAST ONE PROPELLER AND A ROTARY WING PROVIDED WITH TWO ROTORS CARRIED BY TWO HALF-WINGS

(71) Applicant: AIRBUS HELICOPTERS, Marignane (FR)

(72) Inventor: Paul Eglin, Roquefort la Bedoule (FR)

(73) Assignee: AIRBUS HELICOPTERS, Marignane (FR)

( * ) Notice: Subject to any disclaimer, the term of this patent is extended or adjusted under 35 U.S.C. 154(b) by 124 days.

(21) Appl. No.: 17/745,651

(22) Filed: May 16, 2022

(65) Prior Publication Data

US 2022/0380033 A1    Dec. 1, 2022

(30) Foreign Application Priority Data

May 25, 2021   (FR) ........................................ 2105429

(51) Int. Cl.
| | | |
|---|---|---|
| *B64C 27/26* | (2006.01) | |
| *B64C 11/00* | (2006.01) | |
| *B64C 27/59* | (2006.01) | |
| *B64D 35/06* | (2006.01) | |

(52) U.S. Cl.
CPC .............. *B64C 27/26* (2013.01); *B64C 11/00* (2013.01); *B64C 27/59* (2013.01); *B64D 35/06* (2013.01)

(58) Field of Classification Search
CPC ......... B64C 27/26; B64C 27/22; B64C 27/08; B64C 2027/8236
See application file for complete search history.

(56) References Cited

U.S. PATENT DOCUMENTS

| | | | |
|---|---|---|---|
| 4,469,294 A | 9/1984 | Clifton | |
| 2016/0031555 A1* | 2/2016 | Bevirt | B64C 27/28 |
| | | | 244/7 C |
| 2016/0207625 A1 | 7/2016 | Judas et al. | |
| 2017/0034774 A1 | 2/2017 | Nathanson et al. | |

FOREIGN PATENT DOCUMENTS

| | | | |
|---|---|---|---|
| DE | 29916203 U1 | 10/2000 | |
| DE | 102019001834 A1 | 9/2020 | |
| RU | 2627963 C1 | 8/2017 | |
| RU | 2636826 C1 * | 11/2017 | |

OTHER PUBLICATIONS

French Search Report for French Application No. FR2105429, Completed by the French Patent Office, Dated Jan. 28, 2022, 8 pages.

* cited by examiner

*Primary Examiner* — Timothy D Collins
*Assistant Examiner* — Eric Acosta
(74) *Attorney, Agent, or Firm* — Brooks Kushman P.C.

(57) ABSTRACT

An aircraft comprising two half-wings extending to either side of an airframe. The aircraft comprises at least one propeller arranged in the rear part of the airframe. The aircraft comprises a rotary wing provided with two synchronized counter-rotating rotors carried respectively by the half-wings. The aircraft comprises a power plant comprising at least one engine and a mechanical interconnection system connecting the power plant permanently to the rotors except in the event of failure and during training, and to the at least one propeller.

20 Claims, 6 Drawing Sheets

AIRCRAFT HAVING AT LEAST ONE PROPELLER AND A ROTARY WING PROVIDED WITH TWO ROTORS CARRIED BY TWO HALF-WINGS

CROSS REFERENCE TO RELATED APPLICATIONS

This application claims priority to French patent application No. of FR 21 05429 filed on May 25, 2021, the disclosure of which is incorporated in its entirety by reference herein.

TECHNICAL FIELD

The present disclosure relates to an aircraft having at least one propeller and a rotary wing provided with two rotors carried by two half-wings.

BACKGROUND

A rotorcraft is a machine whose lift is provided totally or partially by at least one rotary wing. The rotary wing usually comprises at least one large-diameter rotor.

The rotorcraft category consists of several different types of aircraft.

First and foremost, the helicopter comprises at least one rotor. The rotor is driven by a prime mover suitable for providing both lift and propulsion for the aircraft.

A helicopter may be equipped with two rotors arranged one behind the other in a longitudinal direction extending between a nose and a tail of this helicopter. The first and second rotors are counter-rotating. The combined effect of the yaw torque of each rotor thus makes it possible to stabilize the rotorcraft with respect to its yaw axis during straight-and-level flight, in the absence of wind. It should be noted that it is possible to synchronize the speed of rotation of the rotors in order to ensure that the blades of these rotors do not collide. The blades are then said to be intermeshing blades when they intersect, because the rotating blades of the first rotor have a constant azimuth offset with respect to the rotating blades of the second rotor.

The gyroplane is a rotorcraft whose rotor does not receive power, but provides lift by rotating in autorotation under the effect of the forward speed of the rotorcraft.

Meanwhile, the gyrodyne is an intermediate rotorcraft combining aspects of the helicopter and the gyroplane, the rotor of which only provides lift. This rotor is normally driven by a power plant during the take-off, hovering or vertical flight and landing phases, like the helicopter. A gyrodyne also comprises an additional propulsion system different from the rotor assembly. During forward flight, the rotor still provides lift, but only in autorotation mode, i.e., without driving power being transmitted to the rotor.

The compound helicopter, which takes off and lands like a helicopter, and that flies in cruise mode like a gyroplane, is also known.

The tilt-rotor aircraft is another specific type of rotorcraft.

A further type is referred to for convenience as the "hybrid helicopter". This hybrid helicopter has a fuselage and a rotor. The hybrid helicopter is also provided with at least one pusher propeller and two half-wings extending on either side of a central airframe. The rotor and the propeller or propellers are connected to at least one engine by a mechanical interconnection system.

In this configuration, this hybrid helicopter is remarkable in that the rotational speeds of the engine outputs, the rotor, the propeller or propellers and the mechanical interconnection system are proportional to each other, the proportionality ratios being constant regardless of the flight configuration of the hybrid helicopter under normal operating conditions of the integrated kinematic linkage.

Therefore, and advantageously, the rotor is always rotated by the engine or engines and always generates lift, irrespective of the configuration of the hybrid helicopter, during both forward flight and hovering flight. The hybrid helicopter is therefore neither a gyroplane, nor a gyrodyne, nor a compound helicopter, but is rather another type of rotorcraft.

This hybrid helicopter makes it possible to carry out missions involving extended periods of vertical flight, high-speed cruise flights, and also allows long-range travel, while permitting hovering flight and vertical take-offs.

Document US 2017/034774 describes a hybrid helicopter having a central airframe carrying two rotors situated one behind the other in a longitudinal direction of this hybrid helicopter, two propellers and two half-wings.

The prior art includes the V-22 rotorcraft, which comprises two tilt rotors.

The S-97 rotorcraft comprises two coaxial counter-rotating rotors, and a propeller situated at the rear of the rotorcraft.

The Cheyenne rotorcraft comprises two half-wings, a main rotor, a rear rotor and a propeller.

The Ka-22 rotorcraft comprises two half-wings extending to either side of a central airframe. The rotorcraft comprises two power plants, one at each wing tip. Each power plant comprises an engine, a rotor and a propeller.

A design of this type was presented at an air show in Tianjin in 2017.

Various drones are known. For example, document US 2016/0207625 describes a drone that has four independent rotors and one propeller.

Artists' impressions, in particular of a gyroplane, can also be viewed on the Internet at the following address: https://www.deviantart.com/cutangus/art.

Documents RU 2 636 826 C1, RU 2 627 963 C1, DE 10 2019 001834 A1, U.S. Pat. No. 4,469,294 A, and DE 299 16 203 U1 are also known.

SUMMARY

An object of the present disclosure is therefore to propose an innovative rotary-wing aircraft which is neither a gyroplane, nor a compound rotorcraft, nor a gyrodyne.

The disclosure thus relates to an aircraft comprising:

an airframe extending longitudinally in an anteroposterior plane from a rear part towards a nose;

a rotary wing provided with two counter-rotating rotors;

at least one propeller arranged in the rear part;

a power plant comprising at least one engine;

a mechanical interconnection system connecting the power plant permanently to said rotors, except in the event of failure and during training, and to said at least one propeller; and two half-wings extending to either side of the airframe.

The two rotors are carried respectively by the half-wings and arranged respectively above said half-wings, the two rotors being synchronized or indeed possibly intermeshing.

The expression "and arranged above said half-wings" means that each rotor comprises blades that move above at least one half-wing when the aircraft is on the ground in a normal position, i.e., when the landing gear or landing gears of the aircraft are resting on the ground.

The two half-wings may form a discontinuous or continuous wing.

Therefore, during level flight or indeed during all flight phases, and generally when the propeller or propellers are being driven in rotation, the rotors and the propeller or propellers are rotated, by the mechanical system, at proportional respective speeds with constant ratios. The aircraft is therefore not a gyroplane.

The two rotors are arranged on the half-wings respectively to either side of the anteroposterior plane and are synchronized, i.e., they rotate at identical speeds. This arrangement helps prevent the flow of air passing through one rotor from disturbing the other rotor during forward flight.

According to one possible variant, the two rotors are also intermeshing rotors. The blades of the rotors therefore intersect, having a constant azimuth offset. The fact that the rotors are intermeshing rotors helps limit the transverse space requirement of the aircraft.

Moreover, the two rotors make it possible, in particular, to easily control the yaw movement of the aircraft. Arranging the two counter-rotating rotors on the half-wings also dispenses with the need to use a specific anti-torque device, which consumes high amounts of mechanical power. In particular, the propeller or propellers optionally have the sole function of contributing to the propulsion of the aircraft, and not of helping control the yaw of this aircraft.

Moreover, owing to their arrangement above the half-wings, the rotors pose a limited danger to passengers wishing to board the aircraft or disembark from the aircraft.

During forward flight, the rotors are always driven by the power plant, except in the event of failure or simulated failure in the context of a pilot training mission. However, during fast forward flight, these rotors essentially contribute to the lift of the aircraft, in conjunction with the half-wings, the propulsion essentially being provided by the propeller or propellers.

At high speed, the speed of rotation of the rotors can be adapted in order to ensure that the speed at the advancing blade tip of the two rotors does not exceed a threshold. The resulting reduction in lift is compensated for by the half-wings.

The features set out above help obtain, in synergy, an aircraft that has the maneuverability of a conventional helicopter in hovering flight and at low speeds and that is able to achieve high air speeds by virtue of the propeller or propellers.

This combination helps obtain a long-range aircraft with a high forward speed and having an optimized level of safety on the ground.

The aircraft may comprise one or more of the following features, taken individually or in combination.

For example, the propeller or propellers may be ducted, in particular in order to improve the safety of people on the ground.

According to another possibility compatible with the preceding possibilities, the mechanical system may comprise an inhibitor for disconnecting said at least one propeller from said power plant.

The inhibitor may comprise a clutch or an equivalent, for example.

The propeller or propellers are useful in order to achieve high forward speeds. At low speed, during hovering flight, the propeller or propellers may be stopped. For example, approach maneuvers and take-off maneuvers may be carried out without setting the propeller or propellers in rotation with the power plant. For example, during hovering flight, the inhibitor may inhibit the operation of the propeller or propellers, the rotors being sufficient in order to control the yaw of the aircraft.

Moreover, the inhibitor may inhibit the operation of the propeller or propellers on the ground. This has significant advantages. It helps minimize the sound nuisance generated by the aircraft on the ground, since no propeller is generating harmful noise while on the ground. Moreover, there is no propeller posing a danger to people operating in the vicinity of the aircraft, who may be loading/unloading the aircraft, for example. This advantage is maximized by arranging the propeller or propellers in the rear part of the aircraft.

According to another possibility compatible with the preceding possibilities, the half-wings may constitute a low wing or an intermediate wing.

Alternatively, the half-wings may form a high wing.

Since the rotors are carried by the half-wings, this feature makes it possible to optimize the distance between the rotors and the airframe or the ground in order to maximize the safety of individuals operating in the vicinity of the aircraft, in particular on a platform.

In particular for this purpose, and according to another possibility compatible with the preceding possibilities, each half-wing may have a positive dihedral angle.

The rotors may therefore be relatively close to the half-wings, which optimizes the mechanical system, while remaining at a distance from the airframe and the ground.

Alternatively, a zero or even negative dihedral angle may be considered. In this case, the rotors may be arranged far above the half-wings.

According to another possibility compatible with the preceding possibilities, the mechanical system may comprise one lateral gearbox for each rotor, each lateral gearbox being carried by a half-wing.

Each lateral gearbox is, for example, situated in a free end zone of a half-wing.

Each lateral gearbox may be positioned in a nacelle carried by a half-wing.

According to another possibility compatible with the preceding possibilities, the mechanical system may comprise a main gearbox connected to said at least one engine and to each rotor and to said at least one propeller.

For example, the main gearbox is connected by two lateral mechanical links to two lateral gearboxes and by a rear mechanical link to a rear gearbox of each propeller.

According to another possibility compatible with the preceding possibilities, said power plant may comprise at least one engine situated in said airframe.

The engine or engines are possibly positioned above a cabin. The airframe may comprise protective covers protecting the engine or engines and reducing the aerodynamic drag.

If appropriate, the engine or engines may be connected to a main gearbox by respective "engine" links.

According to another possibility compatible with the preceding possibilities, said power plant may comprise at least two engines respectively carried by said half-wings.

The engines may be arranged in nacelles, for example at the wing tips. The engines may each be connected to a lateral gearbox, this lateral gearbox leading to a rotor, and a main gearbox also connected to the propeller or propellers.

According to another possibility compatible with the preceding possibilities, when there are two rotors that intersect, i.e., intermeshing rotors, the two rotors may intersect in an overlap area situated above said airframe.

As a result, the transverse space requirement of the aircraft is optimized.

According to another possibility compatible with the preceding possibilities, the rear part of the aircraft may comprise a stabilizer assembly carrying said at least one propeller.

A stabilizer assembly may comprise at least one tailplane and/or at least one vertical stabilizer and tailplane or vertical stabilizer flaps to ensure static incidence correction and control sideslip when turning.

The stabilizer assembly is, for example, carried by a tail boom of the airframe and carries one or more propellers.

According to another possibility compatible with the preceding possibilities, the aircraft may comprise one said propeller arranged in the anteroposterior plane.

For example, the propeller is situated at the end of the stabilizer assembly, behind the tailplane and/or tailplanes and vertical stabilizer or stabilizers, if provided, with respect to a direction of forward travel the aircraft.

Additionally, or alternatively, the aircraft may comprise two propellers arranged to either side of the anteroposterior plane.

The use of two propellers, rather than one propeller, makes it possible to achieve higher cruise speeds and/or achieve the desired thrust with a lower speed of rotation of the propellers, which reduces the noise footprint of the aircraft.

For example, a stabilizer assembly is Y-shaped, having a central branch and two lateral branches, said two propellers being carried respectively by said two lateral branches and, for example, at the ends of the lateral branches. In this case, the rear mechanical link may, if provided, comprise an intermediate gearbox connected to rear gearboxes of the propellers.

Each propeller may be arranged at the leading edge or the trailing edge of the corresponding lateral branch. An arrangement at the leading edge tends to reduce the sound intensity of the noise generated.

According to another possibility compatible with the preceding possibilities, each half-wing may comprise at least one control device of the aircraft, a rudder and/or flap, for example. It is possible to use these control devices to control the pitch or roll angle of the aircraft at high speeds, the main rotors then only contributing to the lift of the aircraft. The control devices also make it possible to control the distribution of lift between the half-wings and the rotary wing, and reduce the interactions between this rotary wing and the half-wings.

According to another possibility compatible with the preceding possibilities, the aircraft may comprise a collective control system modifying the pitch of the rotor blades in the same manner, a cyclic pitch control system cyclically modifying the pitch of the rotor blades in the same manner, a cyclic roll control system cyclically modifying the pitch of the rotor blades in the same manner, a cyclic yaw control system cyclically modifying the pitch of the blades of the rotors in a different manner for the two rotors, and a collective control device modifying the pitch of the blades of said at least one propeller in the same manner.

At low speeds, the lift is controlled by means of the collective control system by collectively modifying the pitch of the rotor blades in an identical manner. The pitch and roll are controlled by means of the cyclic pitch and roll control systems. The yaw is controlled by a differential nose-down or nose-up cyclic pitch applied to the two rotors by the cyclic yaw control system.

For example, each rotor comprises a set of conventional swashplates that are commanded in order to control the lift, pitch and roll of the aircraft.

In order to increase the forward speed of the rotorcraft, the pitch of the blades of the propeller or propellers is modified and/or the discs described by the rotor blades are tilted forwards.

At high forward speeds, the lift is provided by the two rotors and the half-wings. The pitching motion can be balanced at constant incidence. A tailplane flap can help optimize pitch balancing. The yaw motion is controlled in the same manner as at low speed by means of a vertical stabilizer flap.

BRIEF DESCRIPTION OF THE DRAWINGS

The disclosure and its advantages appear in greater detail in the context of the following description of embodiments given by way of illustration and with reference to the accompanying figures, in which.

DETAILED DESCRIPTION

Elements that are present in more than one of the figures are given the same references in each of them.

FIGS. 1 to 9 show embodiments of an aircraft 1 according to the disclosure.

Figure 1:
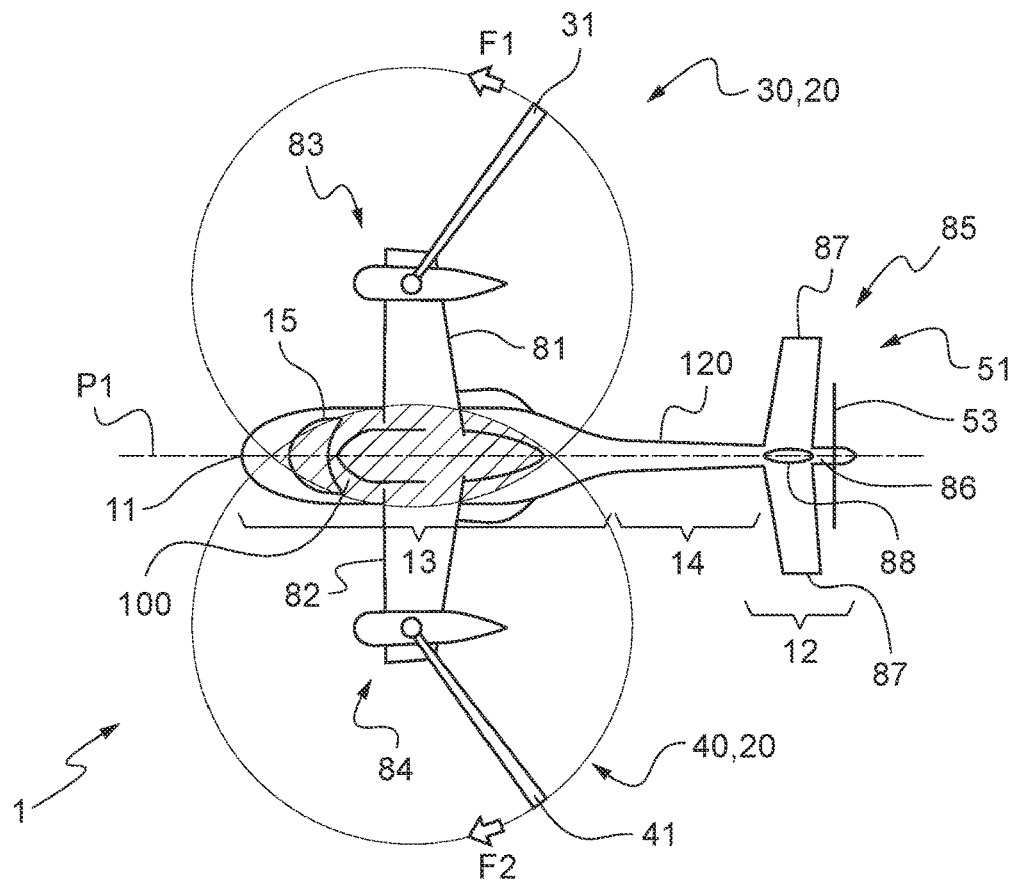
FIG. 1 is a top view of an aircraft with one propeller.

Regardless of the embodiment, and in reference to FIG. 1, an aircraft 1 comprises an airframe 10. The airframe 10 extends longitudinally in an anteroposterior plane P1 from a rear part 12 towards a nose 11. The anteroposterior plane P1 may be a plane of symmetry of the airframe 10 or indeed of the aircraft 1. Optionally, the airframe 10 successively comprises, starting from the nose 11, a front part 13 that comprises, for example, a cabin 15, an intermediate part 14 that comprises, for example, at least one tail boom, and the rear part 12.

The aircraft 1 is further provided with a fixed wing carried by the airframe 10. This fixed wing comprises two half-wings 81, 82 which extend transversely to either side of the airframe 10. The two half-wings 81, 82 may together form a continuous or discontinuous wing.

Each half-wing 81, 82 may comprise flaps and/or rudders, for example.

Moreover, the rear part 12 may comprise a stabilizer assembly 85. This stabilizer assembly 85 may comprise an end segment 86 of the tail boom 14, if provided. In order to stabilize the aircraft 1, the stabilizer assembly 85 may be provided with at least one horizontal or tilted tailplane member contributing at least to the pitch stabilization of the aircraft 1 and/or at least one vertical stabilizer member 88 contributing at least to the yaw stabilization de the aircraft 1. A tailplane member 87 and/or a vertical stabilizer member 88 may be made movable via at least one actuator. Alternatively, part of a tailplane member 87 and/or part of a vertical stabilizer member 88 may be made movable via at least one actuator.

According to the example of FIG. 1, the stabilizer assembly 85 comprises an end segment 86 carrying two vertical stabilizer members 88 situated to either side of the end segment 86, projecting upwards. Moreover, the end segment 86 carries two tailplane members 87 situated to transversely either side of the end segment 86.

According to another aspect, the aircraft may comprise at least one skid or wheel landing gear cooperating with the airframe, a half-wing or indeed the rear part.

Moreover, the aircraft 1 comprises at least one propeller provided with blades 53. The propeller or propellers are arranged in the rear part 12, and are optionally carried by a stabilizer assembly 85. FIGS. 1 to 4 show an aircraft with one propeller 51 whereas FIGS. 5 to 9 show the arrangement of two propellers 51, 52.

Moreover, and regardless of the embodiment, the aircraft 1 comprises a rotary wing 20. The rotary wing 20 is provided with two counter-rotating rotors 30, 40. One rotor 30 rotates about its axis of rotation in a direction F1 and the other rotor 40 rotates about its axis of rotation in a direction F2 opposite the first direction F1. One of the rotors rotates clockwise and the other rotor anticlockwise.

The rotors 30, 40 are carried respectively by the half-wings 81, 82. The rotors may be set apart from each other transversely. Alternatively, the blades 31 of one rotor 30 may intersect the blades 41 of the other rotor 40 in an overlap area 100. This overlap area 100 is for example arranged above the airframe 10, in a direction leading from a landing gear towards the rotors, and for example at least partially or indeed completely above the front part 13.

Figure 2:
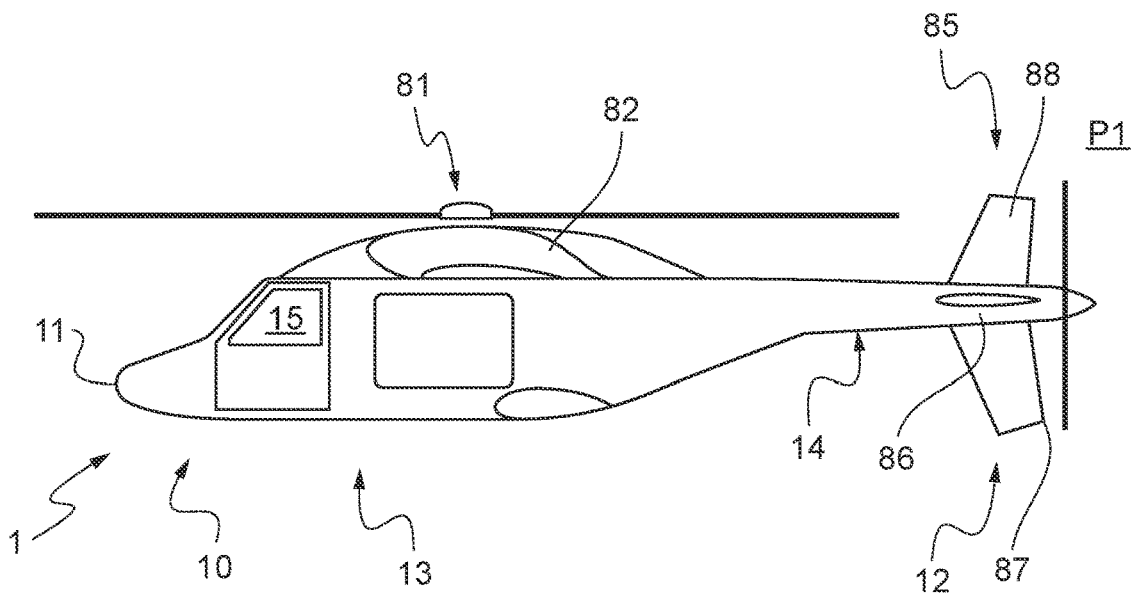
FIG. 2 is a side view of the aircraft of FIG. 1.

In reference to FIG. 2 and in order to separate the blades 31, 41 of the rotors 30, 40 further from the ground, the two half-wings 81, 82 may be part of a high wing, i.e., a wing that extends at a top part of the airframe 10.

Figure 3:
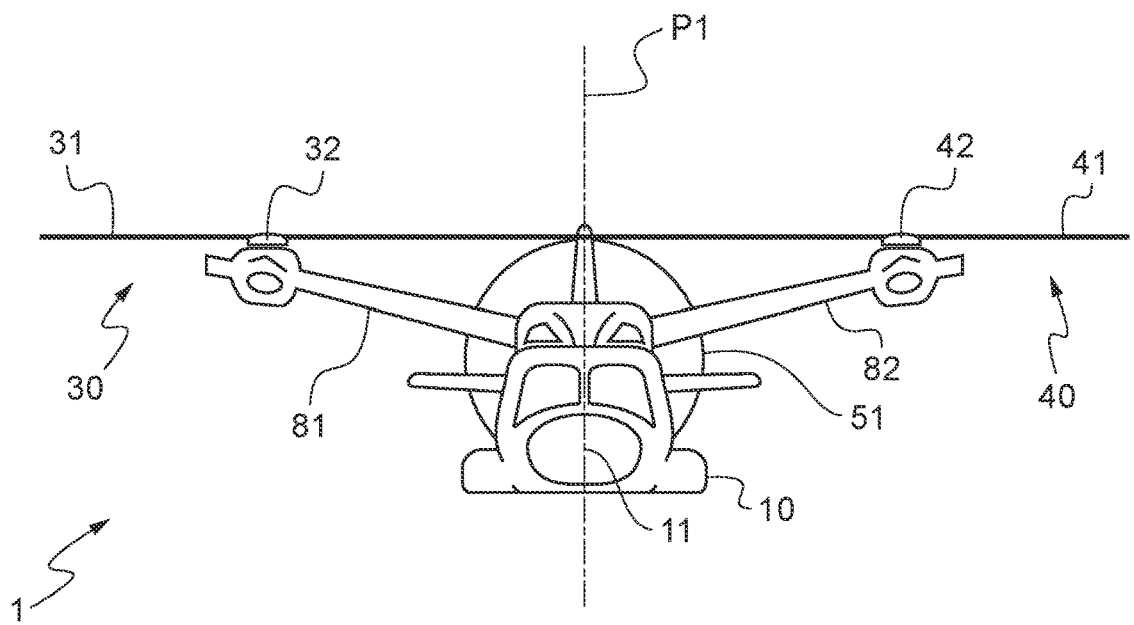
FIG. 3 is a front view of the aircraft of FIG. 1.

In reference to FIG. 3, the two half-wings 81, 82 may have a positive dihedral angle.

Figure 4:
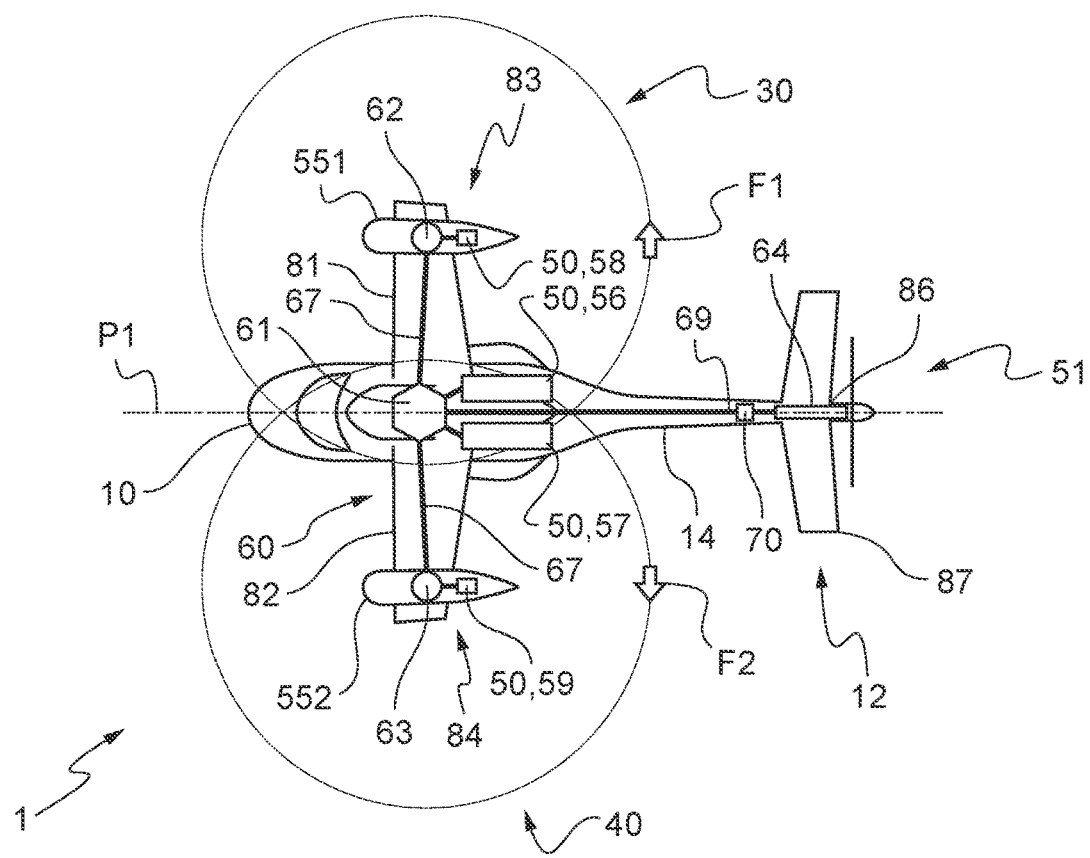
FIG. 4 is a top view of an aircraft according to the disclosure in which the airframe is rendered transparent in order to show the power plant and the mechanical interconnection system.

In reference to FIG. 4 and regardless of the embodiment, in order to set the rotors 30, 40 and the propeller or propellers 51, 52 in motion, the aircraft 1 comprises a power plant 50 comprising at least one engine 56, 57, 58, 59 and a mechanical interconnection system 60.

For example, the power plant 50 comprises at least one engine, or indeed at least two engines 56, 57 arranged in the airframe 10, for example in the front part 13 and indeed above the cabin 15. The airframe 10 may comprise aerodynamic fairings around the engines 56, 57.

Additionally, or alternatively, the power plant 50 may comprise at least two engines 58, 59 respectively carried by the half-wings 81, 82, for example at free end zones 83, 84 of the half-wings 81, 82. Each free end zone 83, 84 is a segment of a half-wing 81,82 comprising the end of the half-wing and sections of the half-wing closer to the end of the half-wing than to the airframe 10. For example, the two half-wings 81, 82 carry two nacelles 551, 552 respectively receiving two engines 58, 59.

The mechanical system 60 mechanically and kinematically connects the rotors 30, 40, the engine or engines 56, 57, 58, 59 and the propeller or propellers 51, 52. More specifically, the mechanical system 60 mechanically and kinematically connects the engine or engines 56, 57, 58, 59 to the rotors 30, 40, permanently, except in the event of failure and during training. Therefore, the engine or engines 56, 57, 58, 59 comprise power shafts that are able to rotate at a speed proportional to a speed of rotation of the rotors 30, 40, the rotors 30, 40 being synchronized and moving at the same speed of rotation.

Moreover, the mechanical system 60 mechanically and kinematically connects the engine or engines 56, 57, 58, 59 to the propeller or propellers 51, 52, permanently or at the request of a human pilot or an autopilot, when an inhibitor 70 is present. When the propeller or propellers 51, 52 are set in motion, the speed of rotation of the propeller or propellers 51, 52 is proportional to the speed of rotation of the power shaft or shafts.

The mechanical system 60 may comprise a main gearbox arranged in the airframe 10. The main gearbox 61 may be a central component connected by shafts, directly or via other gearboxes, to the engine or engines 56, 57, 58, 59, the rotors 30, 40 and the propeller or propellers 51, 52.

For example, the mechanical system 60 may comprise one lateral gearbox 62, 63 for each rotor 30, 40. Each lateral gearbox 62, 63 may comprise a rotor mast constrained to rotate with the associated rotor 30, 40. The two lateral gearboxes 62, 63 are then carried respectively by the two half-wings 81, 82. The two lateral gearboxes 62, 63 are optionally situated in the end zones 83, 84 of the half-wings 81, 82.

If appropriate, the main gearbox 61 may be connected by two lateral mechanical links 67 respectively to two lateral gearboxes 62, 63. Each lateral mechanical link 67 may comprise at least one shaft, at least one connection member, etc.

The main gearbox 61 may be connected by a rear mechanical link 69 to a rear gearbox of each propeller 51, 52. The rear gearbox or gearboxes 64, 65 may comprise a propeller mast constrained to rotate with the associated propeller 51, 52. The rear mechanical link 69 may comprise at least one shaft, at least one connection member, etc. The rear mechanical link 69 may comprise, between two shafts, an inhibitor 70 that is able to disengage the propeller or propellers 51, 52 from the engine or engines 56, 57, 58, 59. Such an inhibitor 70 may comprise a clutch or an equivalent, for example, optionally supplemented by a means for locking the rear mechanical link 69 in order to prevent the clutch from slipping.

Therefore, at least one engine 56, 57 may be connected by an engine connection to the main gearbox 61 and/or at least one engine 58, 59 may be connected by an engine connection to a lateral gearbox 62, 63.

Irrespective of these aspects, according to the example of FIG. 4, the aircraft 1 comprises a single propeller arranged in the anteroposterior plane P1. The propeller 51 is, for example, carried by the end segment 86 of the tail boom 14. A rear gearbox 64 may be arranged in this end segment 86.

Figure 5:
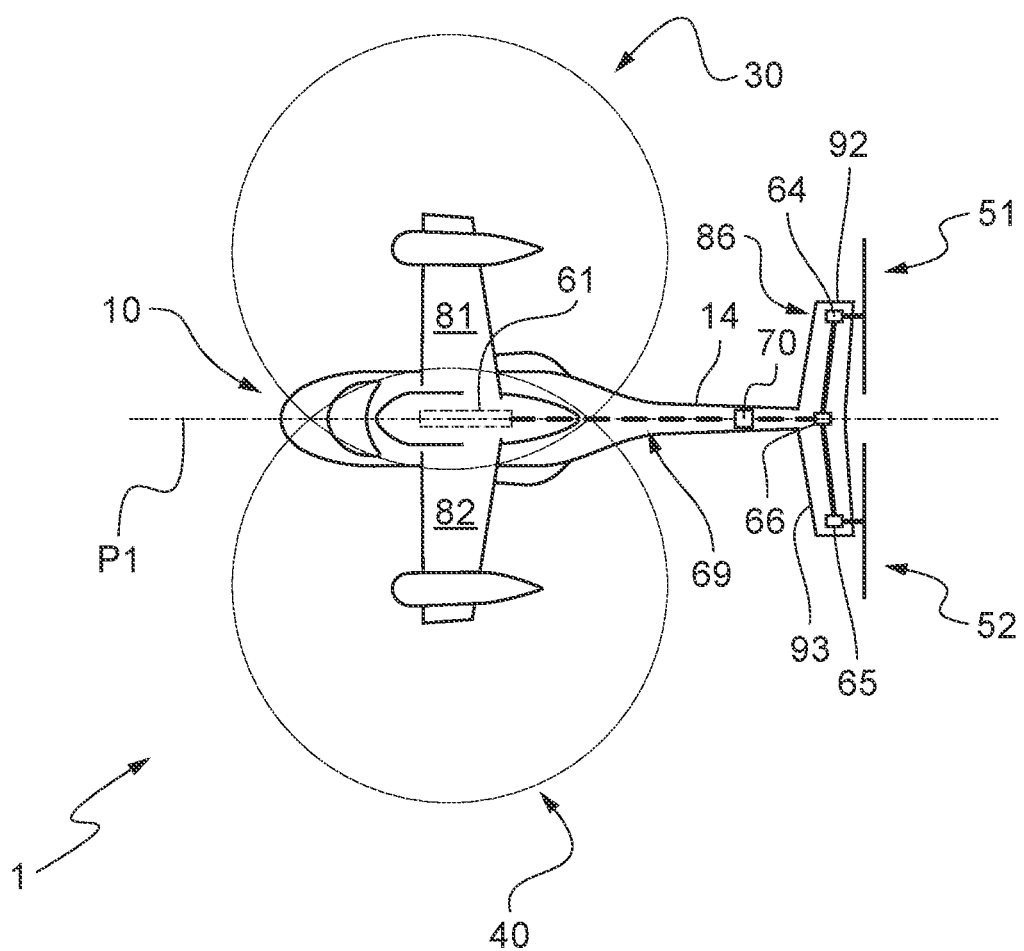
FIG. 5 is a top view of an aircraft with two propellers.

According to FIG. 5, two propellers 51, 52 are arranged to either side of the anteroposterior plane P1. The two propellers 51, 52 are, for example, carried by the stabilizer assembly 85.

Figure 6:
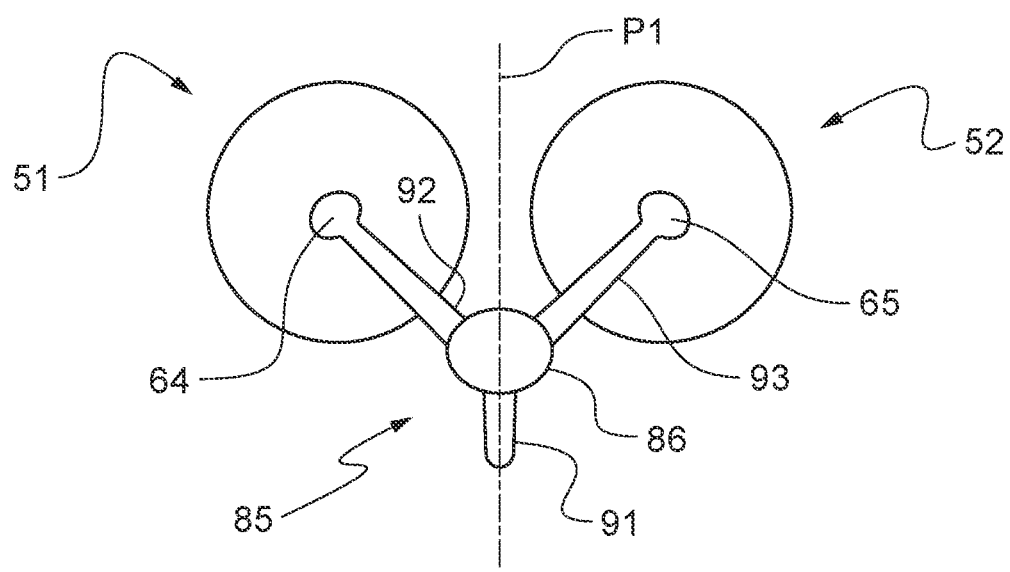
FIG. 6 is a front view of a stabilizer assembly carrying two propellers on the trailing edge.

For example, and as shown in FIG. 6, the stabilizer assembly 85 may then be Y-shaped. The stabilizer assembly 85 then has a central branch 91 forming a vertical stabilizer member and two lateral branches 92, 93 at an acute or right angle to the anteroposterior plane P1. The central branch 91 and the lateral branches 92, 93 may be carried by an end segment 86 of the tail boom. In this case, an intermediate gearbox 66 of the rear mechanical link 69 may be situated in the end segment and may be connected by at least two shafts to two rear gearboxes 64, 65.

Figure 7:
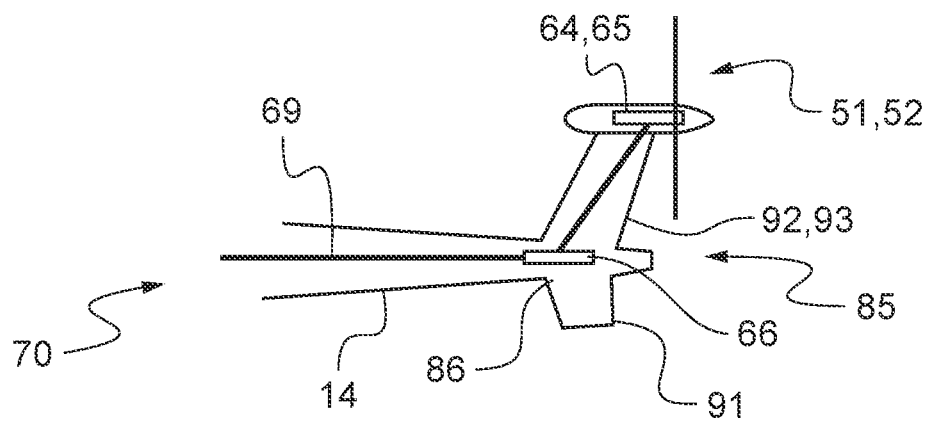
FIG. 7 is a side view of a stabilizer assembly carrying two propellers on the trailing edge rendered partially transparent.

According to FIGS. 6 and 7, the propellers 51, 52 may be positioned at the trailing edge of the lateral branches 92, 93.

Figure 8:
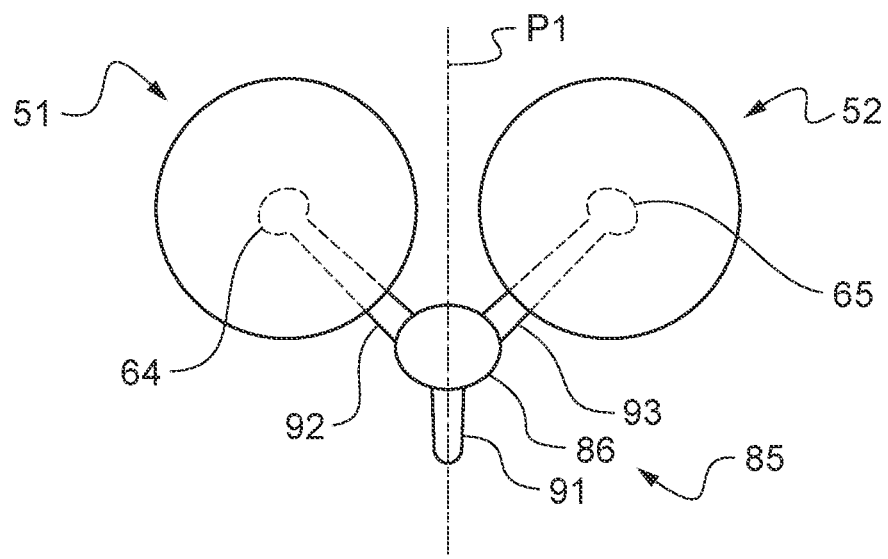
FIG. 8 is a front view of a stabilizer assembly carrying two propellers on the leading edge.
Figure 9:
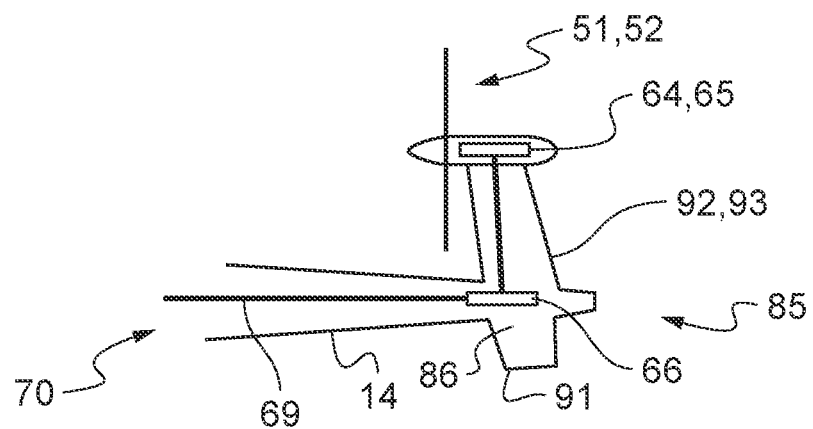
FIG. 9 is a side view of a stabilizer assembly carrying two propellers on the leading edge rendered partially transparent.

According to FIGS. 8 and 9, the propellers 51, 52 may be positioned at the leading edge of the lateral branches 92, 93.

Figure 10:
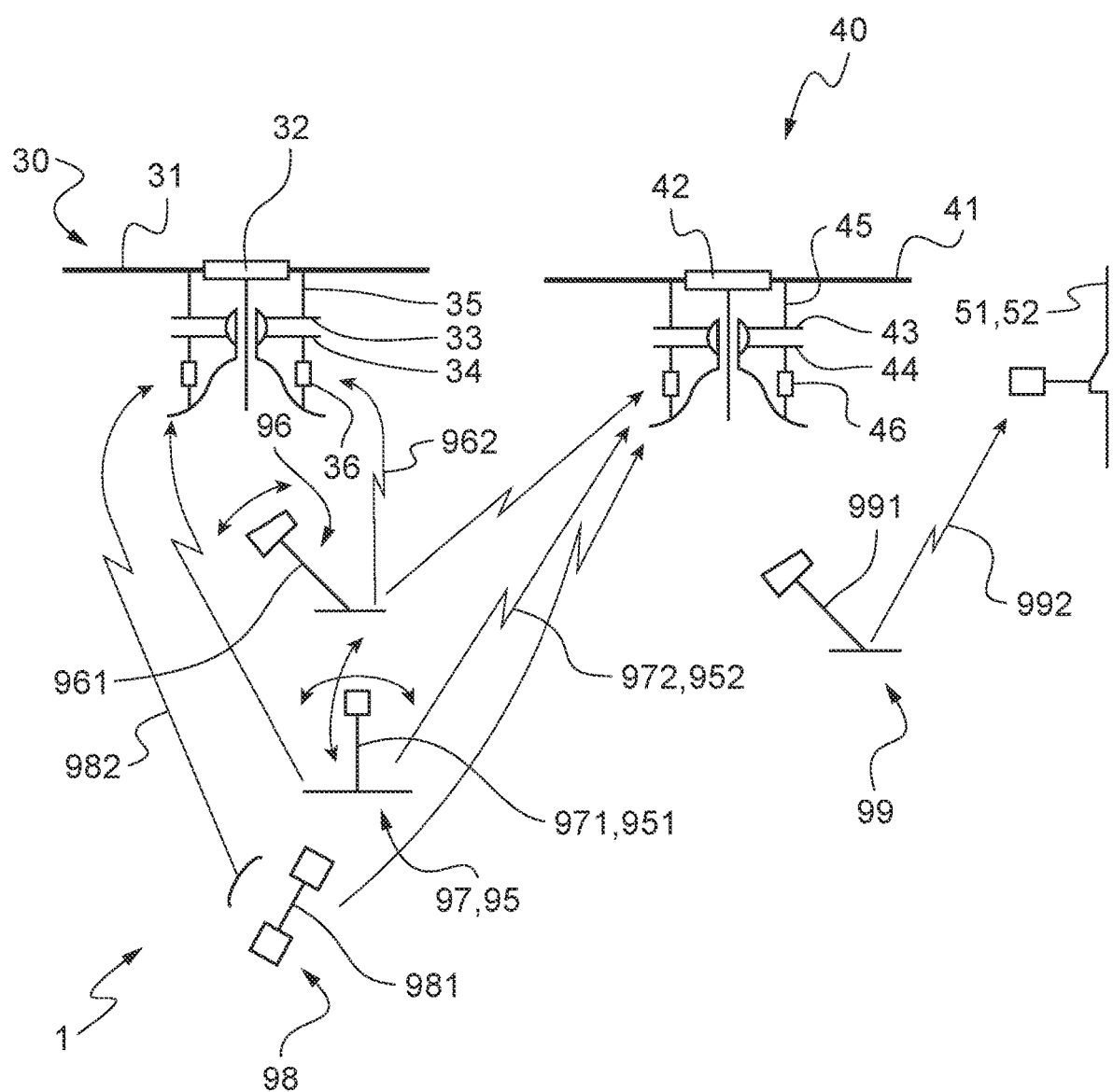
FIG. 10 is a diagram showing a system for controlling an aircraft according to the disclosure.

According to another aspect, FIG. 10 shows a system for controlling the aircraft 1.

This control system may comprise a collective control system 96 collectively modifying the pitch of the blades 31, 41 of the rotors 30, 40 in the same manner for the blades 31, 41 of the two rotors 30, 40.

For example, each rotor 30, 40 comprises blades 31, 41 hinged to a hub 32, 42. Moreover, the blades 31, 41 cooperate with a swashplate system for each rotor 30, 40. Such a swashplate system may comprise one plate 34, 44 hinged to servocontrols 36, 46 and a second plate 33, 43 connected to each blade 31, 41 of the corresponding rotor 30, 40 by pitch links 35, 45.

As a result, the collective control system 96 can control all the servocontrols in the same manner. For example, the collective control system 96 may comprise a collective control interface 961 controlling the servocontrols 36, 46 in the same manner, via a mechanical or electromechanical architecture 962.

The control system may comprise a cyclic pitch control system 95 cyclically modifying the pitch of the blades 31, 41 of the rotors 30, 40 in the same manner for the blades 31, 41 of the two rotors 30, 40. The cyclic pitch control system 95 may incline the rotor discs of the two rotors longitudinally in the same manner to pitch the nose down or up. According to the example shown, the cyclic pitch control system 95 may comprise a cyclic pitch control interface 951 controlling the servocontrols 36, 46 in the same manner, via a mechanical or electromechanical architecture 952.

The control system may comprise a cyclic roll control system 97 cyclically modifying the pitch of the blades 31, 41 of the rotors 30, 40 in the same manner for the blades 31, 41 of the two rotors 30, 40. The cyclic roll control system 97 may incline the rotor discs of the two rotors transversely in the same manner. According to the example shown, the cyclic roll control system 97 may comprise a cyclic roll control interface 971 controlling the servocontrols 36, 46 in the same manner, via a mechanical or electromechanical architecture 972. The cyclic pitch control interface 951 and the cyclic roll control interface 971 may be formed by the same stick that can be moved according to two different axes, for example.

The control system may comprise a cyclic yaw control system 98 cyclically modifying the pitch of the blades of the rotors in a different manner for the two rotors 30, 40. According to the example shown, the cyclic yaw control system 98 may comprise a cyclic yaw control interface 981, a rudder bar, for example, controlling the servocontrols 36, 46 via a mechanical or electromechanical architecture 982.

The control system may comprise a collective control device 99 collectively modifying the pitch of the blades 53 of the propeller or propellers 51, 52 in the same manner for the blades 53 of the propeller or propellers 51, 52. For example, the collective control device 99 may comprise a collective control interface 991 controlling one or more propeller actuators in the same manner via a mechanical or electromechanical architecture 992.

Naturally, the present disclosure is subject to numerous variations as regards its implementation. Although several embodiments are described above, it should readily be understood that it is not conceivable to identify exhaustively all the possible embodiments. It is naturally possible to envisage replacing any of the means described by equivalent means without going beyond the ambit of the present disclosure.

What is claimed is:

1. An aircraft comprising:
an airframe extending longitudinally in an anteroposterior plane from a rear part towards a nose;
a rotary wing provided with two counter-rotating rotors;
at least one propeller arranged in the rear part of the airframe;
a power plant comprising at least one engine;
a mechanical interconnection system connecting the power plant permanently to the rotors except in the event of failure and during training, and the mechanical interconnection system connecting the power plant to the at least one propeller permanently or at the request of a human pilot or an autopilot with an inhibitor; and
two half-wings extending on either side of the airframe, wherein the two rotors are carried respectively by the half-wings and arranged respectively above the half-wings, the two rotors being synchronized, the at least one propeller comprising two propellers arranged to either side of the anteroposterior plane, the rear part comprising a stabilizer assembly, the stabilizer assembly being Y-shaped having a central branch and two lateral branches, the two propellers being carried respectively by the two lateral branches.

2. The aircraft according to claim 1, wherein the inhibitor is capable of selectively disconnecting the propellers from the power plant.

3. The aircraft according to claim 1, wherein the half-wings form a high wing.

4. The aircraft according to claim 1, wherein each half-wing has a positive dihedral angle.

5. The aircraft according to claim 1, wherein the mechanical system comprises one lateral gearbox for each rotor, each lateral gearbox being carried by a half-wing.

6. The aircraft according to claim 5, wherein each lateral gearbox situated in a free end zone of a half-wing.

7. The aircraft according to claim 1, wherein the mechanical system comprises a main gearbox connected to the at least one engine and to each rotor and to the propellers.

8. The aircraft according to claim 1, wherein the power plant comprises at least one engine situated in the airframe.

9. The aircraft according to claim 1, wherein the power plant comprises at least two engines carried respectively by the half-wings.

10. The aircraft according to claim 1, wherein the two rotors intersect.

11. The aircraft according to claim 10, wherein the two rotors intersect in an overlap area situated above the airframe.

12. The aircraft according to claim 1, wherein the aircraft comprises a collective control system modifying the pitch of the blades of the rotors in the same manner, a cyclic pitch control system cyclically modifying the pitch of the blades of the rotors in the same manner, a cyclic roll control system cyclically modifying the pitch of the blades of the rotors in the same manner, a cyclic yaw control system cyclically modifying the pitch of the blades of the rotors in a different manner for the two rotors, a collective control device modifying the pitch of the blades of the propellers in the same manner.

13. An aircraft comprising:
an airframe extending longitudinally in an anteroposterior plane from a rear part towards a nose;
a rotary wing having two counter-rotating rotors;
at least one propeller arranged in the rear part of the airframe;
a power plant comprising at least one engine;
a mechanical interconnection system connecting the power plant permanently to the rotors except in the event of failure and during training, and the mechanical interconnection system connecting the power plant to the at least one propeller permanently or at the request of a human pilot or an autopilot with an inhibitor; and
two half-wings extending on either side of the airframe,
wherein the two rotors are carried respectively by the half-wings and disposed respectively above the half-wings, the two rotors being synchronized, the at least one propeller comprising two propellers disposed on either side of the anteroposterior plane, the rear part comprising a stabilizer, the stabilizer being Y-shaped and having a central branch and two lateral branches, the two propellers being disposed respectively on the two lateral branches.

14. The aircraft according to claim 13,
wherein the half-wings form a high wing.

15. The aircraft according to claim 13,
wherein each half-wing has a positive dihedral angle.

16. The aircraft according to claim 13,
wherein the mechanical system comprises one lateral gearbox for each rotor, each lateral gearbox being carried by a half-wing, and wherein each lateral gearbox situated in a free end zone of a half-wing.

17. The aircraft according to claim 13,
wherein the mechanical system comprises a main gearbox connected to the at least one engine and to each rotor and to the propellers, and wherein the power plant comprises at least one engine situated in the airframe.

18. The aircraft according to claim 13,
wherein the power plant comprises at least two engines carried respectively by the half-wings.

19. The aircraft according to claim 13,
wherein the two rotors intersect in an overlap area situated above the airframe.

20. An aircraft comprising:
an airframe extending longitudinally in an anteroposterior plane from a rear part towards a nose;
a rotary wing provided with two counter-rotating rotors;
two propellers disposed on the rear part of the airframe;
a power plant comprising at least one engine;
a mechanical interconnection system connecting the power plant permanently to the rotors except in the event of failure and during training, and the mechanical interconnection system connecting the power plant to the propellers permanently or at the request of a human pilot or an autopilot with an inhibitor; and
two half-wings extending on either side of the airframe,
wherein the two rotors are synchronized and carried respectively by the half-wings and arranged respectively above the half-wings, the two propellers disposed on either side of the anteroposterior plane, the rear part comprising a Y-shaped stabilizer having a central branch and two lateral branches, the two propellers carried respectively by the two lateral branches.

* * * * *